Nov. 30, 1965    F. A. MARION    3,220,747
BRAKE ACTUATED HARNESS REEL
Filed May 6, 1963    4 Sheets-Sheet 1
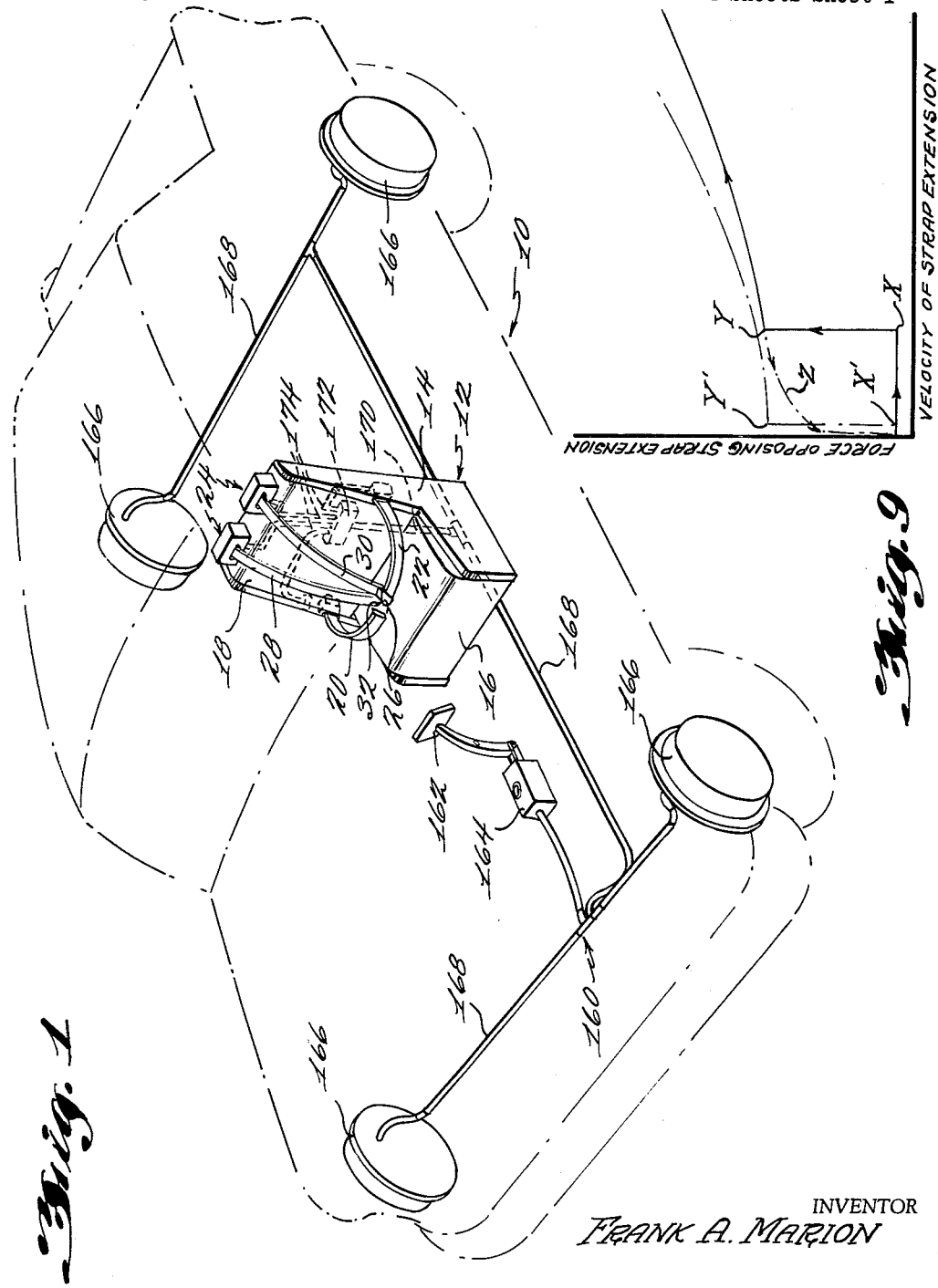
INVENTOR
FRANK A. MARION
BY
Cushman, Darby & Cushman
ATTORNEYS Nov. 30, 1965
F. A. MARION
3,220,747
BRAKE ACTUATED HARNESS REEL
Filed May 6, 1963
4 Sheets-Sheet 2
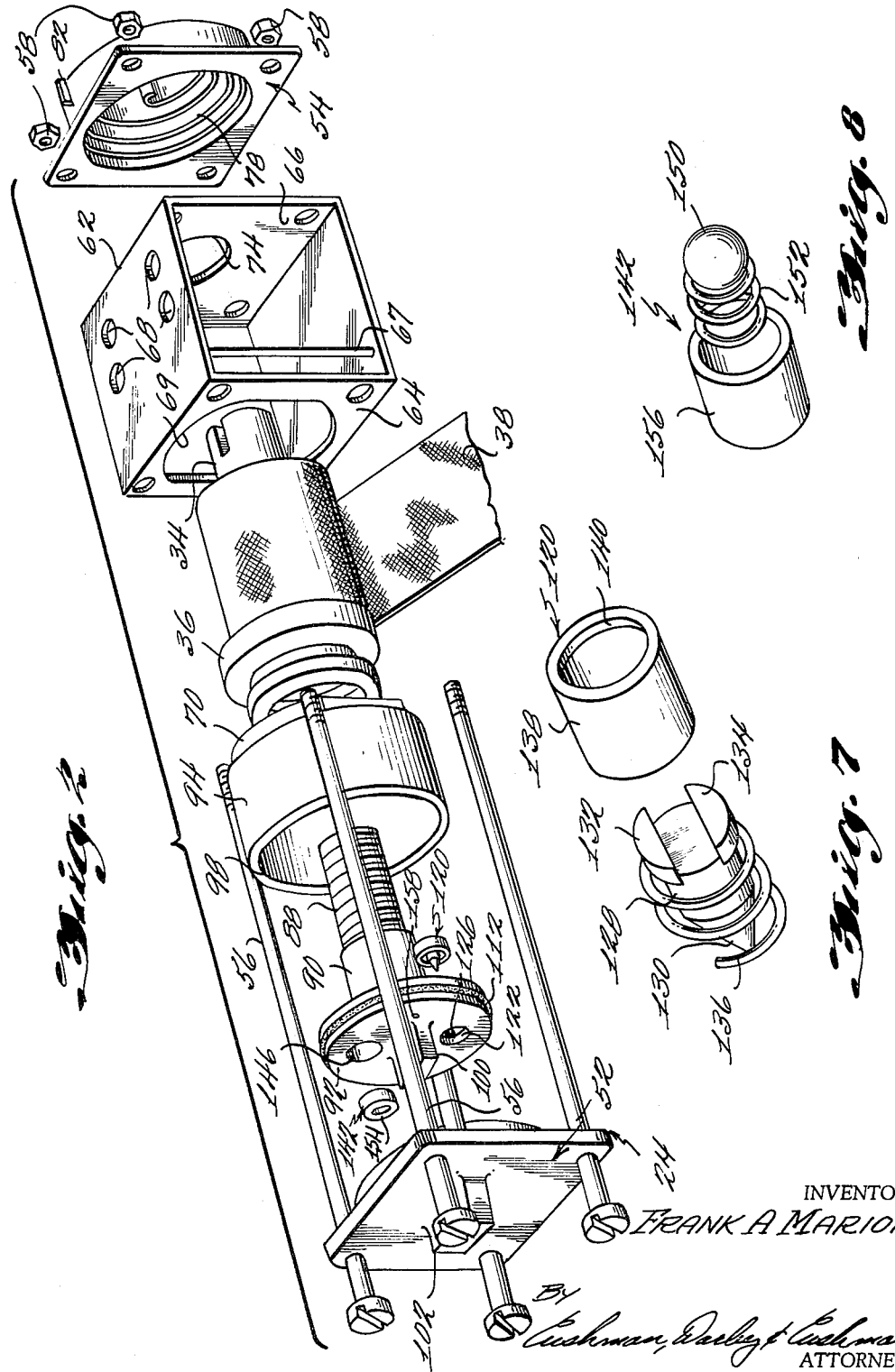
INVENTOR
FRANK A. MARION
BY
Cushman, Darby & Cushman
ATTORNEYS

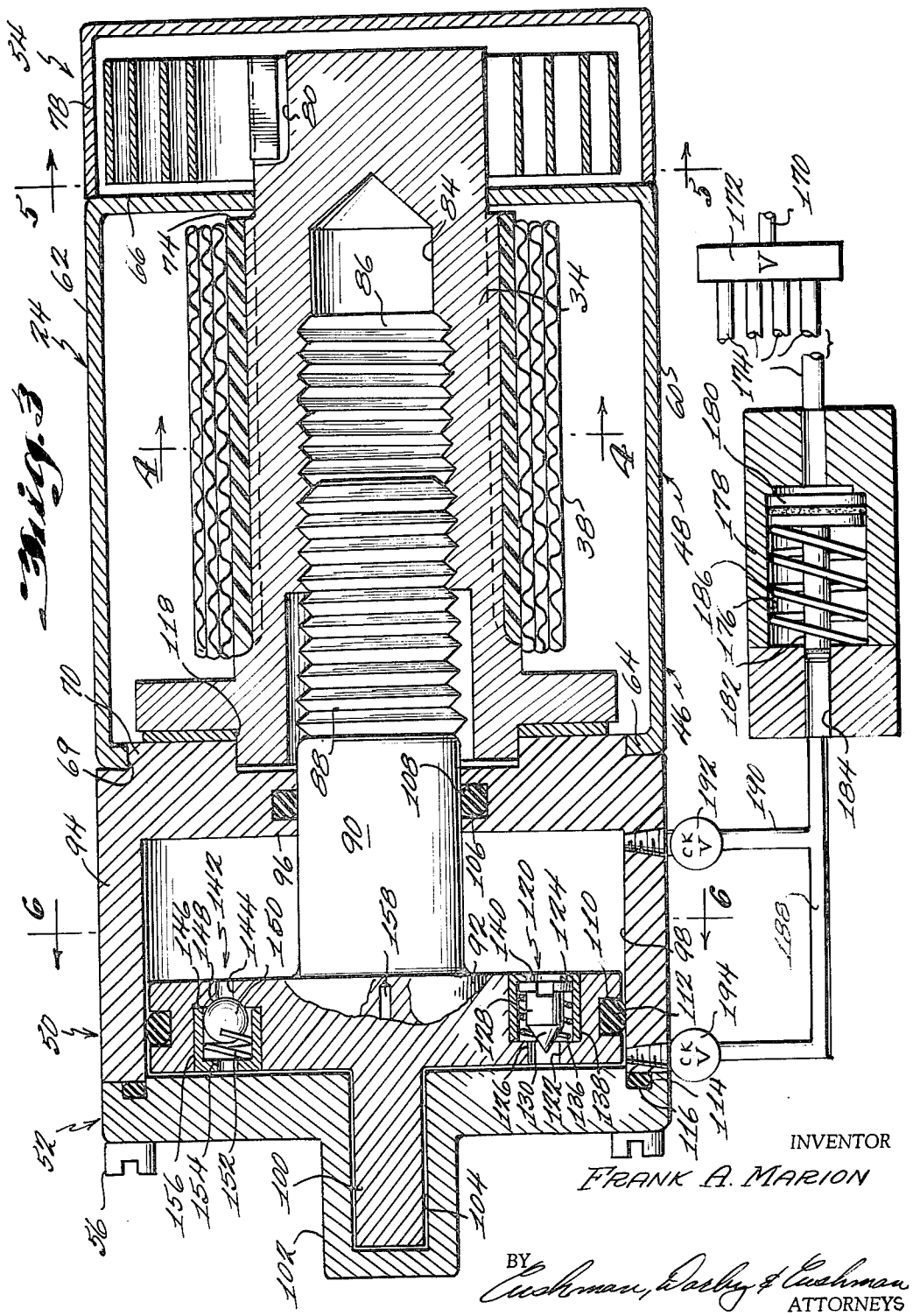

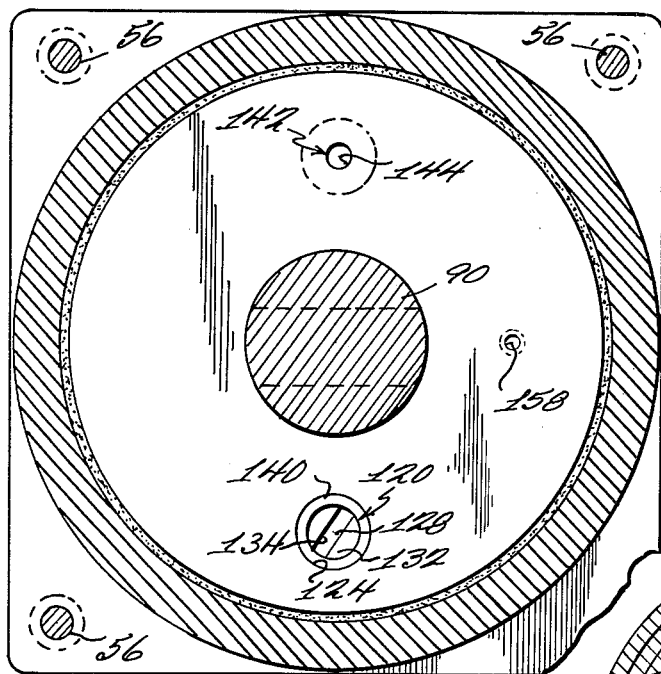
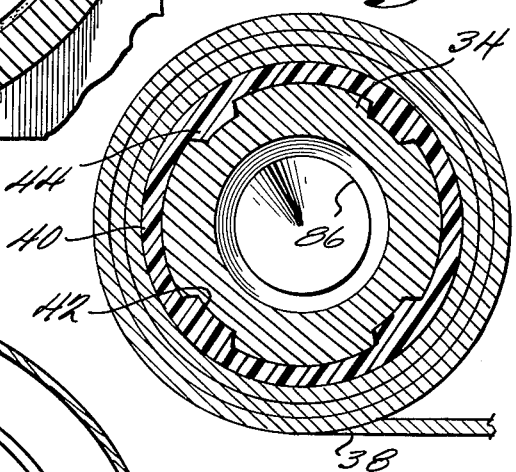
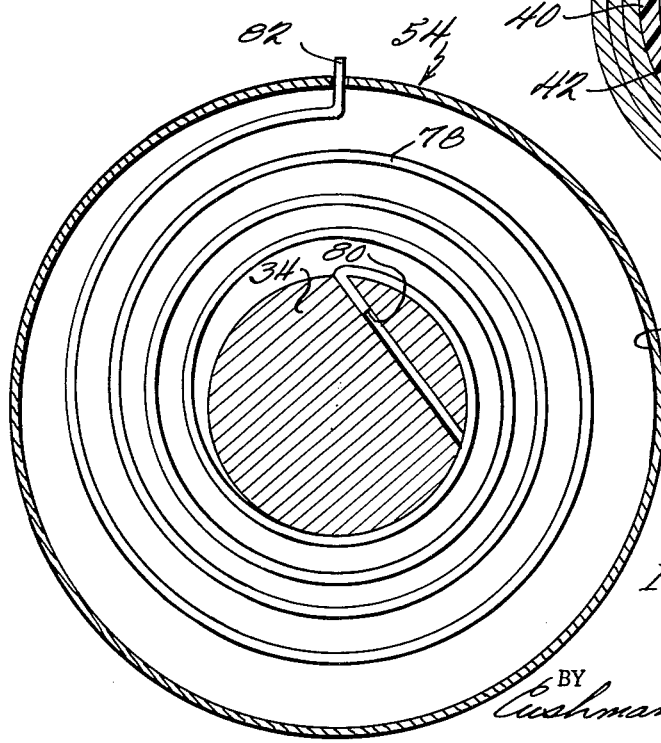

United States Patent Office 3,220,747
Patented Nov. 30, 1965

3,220,747
BRAKE ACTUATED HARNESS REEL
Frank A. Marion, Scottsdale, Ariz., assignor to Rocket Power, Inc., Mesa, Ariz., a corporation of Arizona
Filed May 6, 1963, Ser. No. 278,071
5 Claims. (Cl. 280—150)

This invention relates to safety devices for occupants of a vehicle and more particularly to harness reel structures for safely controlling the movement of seat occupants of a vehicle under emergency conditions.

The present invention is especially adapted as an improvement of the harness reel structure disclosed in my commonly-assigned Bayer application, Serial No. 255,603, filed February 1, 1963, for a Safety Device for a Seat Occupant. In the above mentioned Bayer application, there is disclosed a reel device operatively connectable with a seat occupant harness which is operable to permit the seat occupant to have normal movements within the automobile under normal operating conditions but which is automatically operable in response to excessive or abnormal movement of the seat occupant as, for example, under emergency deceleration conditions, to control the forward movement of the seat occupant so as to stop the seat occupant by a retarding action, thus reducing the peak deceleration forces applied to the seat occupant. The harness reel structure itself includes means for applying pressure to a body of hydraulic fluid in response to the rotational movement of the reel as a result of the extension of the strap therefrom and braking means operable when the pressure of the body of hydraulic fluid reaches a predetermined condition to retard and stop the rotation of the reel and therefore stop the extension of the strap. The reel structure also includes means providing for a relatively unrestricted flow in the body of hydraulic fluid at rotational speeds of the reel equal to and less than the maximum rotational speed resulting from maximum normal extension of the strap maximum normal movements of the seat occupant away from the seat back so that the braking means will not be normally applied. The means also provides for a relatively restricted flow in the body of hydraulic fluid in response to rotational speeds of the reel above a predetermined value resulting from excessive or abnormal strap extensions, as by abnormal movements of the seat occupant away from the seat back under emergency conditions, so that the pressure in the body of fluid will build up to the predetermined condition and the braking means will be applied.

The improvement of the present invention is based upon the proposition that a more instantaneous and effective operation of the reel structure to effect stoppage of the extension of the strap can be obtained by providing for the application of the predetermined pressure condition in the body of fluid in the reel structure, in response to the emergency application of the foot pedal of the brake of the automotive vehicle so that the control of the forward movement of the seat occupant will be in response to such application of the brake system of the vehicle as well as abnormal extensive movements of the harness straps.

Accordingly, it is an object of the present invention to provide a harness reel structure which is operable to permit the seat occupant to have normal movements within the automobile under normal operating conditions but which is automatically operable in response to excessive emergency application of the brake system of the automotive vehicle to safely stop the forward movement of the seat occupant.

Another object of the present invention is the provision of a harness reel of the type described which is operable in the manner indicated above both in response to an excessive application of brake pressure and to an excessive extension of the seat occupant harness.

Still another object of the present invention is the provision of a hydraulically actuated harness reel and means for hydraulically interconnecting the harness reel with a conventional hydraulic braking system of an automotive vehicle so that the harness reel will permit normal movements of the seat occupant but will effectively prevent or control such movements in response to a predetermined actuation of the braking system of the automotive vehicle.

These and other objects of the present invention will become more apparent during the course of the following detailed description and appended claims.

The invention may best be understood with reference to the accompanying drawings wherein an illustrative embodiment is shown.

In the drawings:

FIGURE 1 is a fragmentary perspective view of an automotive vehicle illustrating the hydraulic braking system thereof and a seat therein with a safety apparatus embodying the principles of the present invention operatively connected therebetween;

FIGURE 2 is an exploded perspective view of a harness reel device embodying the principles of the present invention;

FIGURE 3 is an enlarged vertical sectional view of the reel device shown in FIGURE 2;

FIGURE 4 is a sectional view taken along the line 4—4 of FIGURE 3;

FIGURE 5 is a sectional view taken along the line 5—5 of FIGURE 3;

FIGURE 6 is a sectional view taken along the line 6—6 of FIGURE 3;

FIGURE 7 is an enlarged exploded perspective view of the normally open valve assembly of the device;

FIGURE 8 is an enlarged exploded perspective view of the normally closed valve assembly of the device; and, FIGURE 9 is a graph illustrating the theoretical curve obtained by plotting the force opposing strap extension against the velocity of strap extension obtained with the use of the device shown in FIGURES 2 through 8.

Referring now more particularly to the drawings there is shown in FIGURE 1 a portion of an automotive vehicle, generally indicated at 10. The vehicle 10 may be of any conventional structure and includes one or more seats, such as the seat 12 shown in the drawings. Seat 12 may be of any suitable construction and includes a frame 14, a seat cushion 16 and a back cushion 18.

The present invention is more particularly concerned with safety apparatus for an occupant of the seat 12. As shown, the safety apparatus includes a pair of seat belt straps 20 and 22 one end of each of which is connected with a harness reel device, embodying the principles of the invention and generally indicated at 24. The free ends of the seat belt straps 20 and 22 are detachably interconnected by a conventional coupling, generally indicated at 26.

In addition to the seat belt straps 20 and 22, there is also provided a pair of shoulder belt straps 28 and 30. As before, one end of the straps 28 and 30 are connected with a reel device 24 and the opposite ends are detachably connected with the coupling 28, as by additional couplers indicated at 32.

The apparatus shown in FIGURE 1 includes a reel device 24 connected with each of the belt straps. This arrangement illustrates the optimum utilization of the reel device of the present invention. It will be understood that one or both of the seat belt straps 20 and 22 may be anchored to the frame of the vehicle rather than connected with the device 24 and that it is not essential that each of the shoulder belt straps 28 and 30 be connected individually to the reel device 24. That is, the shoulder belt straps could be interconnected at their ends and then connected through a single elongated element to a single reel device 24. It will also be understood that while the apparatus is shown as being connected with the driver's seat, the apparatus may be installed with equal facility in the passenger seats of the vehicle, both front and back. Installation in a tilt forward seat would require a latching mechanism to prevent forward tilting of the seat.

Referring now more particularly to FIGURES 2 and 8, the construction of the reel device 24 will now be described. As best shown in FIGURES 2, 3 and 4, the reel device 24 comprises a reel member 34 of generally cylindrical configuration having an annular flange 36 extending radially outwardly from the periphery thereof adjacent one end. Any suitable means is provided for attaching the inner end of an elongated element to the central portion of the reel. As shown, the elongated element which may be a cable or the like is shown in the form of a belt or strap 38, the outer end portion of which may constitute either of the seat belt straps 20 or 22 or the shoulder belt straps 28 and 30 previously described. As best shown in FIGURE 4, the inner end portion of the strap 38 is formed into a cylindrical configuration and imbedded within a plastic cylindrical member 40 having a plurality of circumferentially spaced longitudinally extending ribs 42 formed on the inner periphery thereof. The outer periphery of the central portion of the reel member 34 is provided with a series of circumferential spaced longitudinally extending grooves 44 arranged to receive the ribs 42. In this way, the belt 38 is readily assembled in proper relation with the reel member 34 by axially sliding the cylindrical member 40 onto the central outer periphery of the reel member over the end thereof opposite the flange 36.

The reel member 34 is mounted for rotary movement and limited axial movement within a frame or housing, generally indicated at 46, which, as shown, is preferably made up of a tubular section 48, a cylindrical section 50, and a pair of end sections 52 and 54. As best shown in FIGURE 2, the frame or housing sections are assembled and fastened together in general axial alignment by any suitable means, such as a plurality of elongated bolts 56 extending through suitable registering apertures in the end sections 52 and 54 and the tubular section 48. The bolts 56 are threaded adjacent their outer extremities to receive nuts 58 or similar fastening elements to complete the assembly.

It will be noted that the tubular section 48 is preferably formed by cutting a piece from an elongated hollow tubular member of generally square cross sectional configuration. The tubular member 48 thus includes a pair of upper and lower horizontal walls 60 and 62 and a pair of transverse walls 64 and 66. With this construction the front and back of the housing section 48 are opened to permit the strap 38 to extend alternatively either from the front or back of the housing section. To this end, a guide rod 67 is preferably mounted between the horizontal walls 60 and 62 either at the front or back, depending upon the disposition of the strap end, to maintain the strap in proper relation on the reel member during extension and retraction. In addition, openings 68 may be formed in the upper wall 62 so as to receive fastening elements for attaching the device to the seat 14.

The central portion of the lateral wall 64 has an opening 69 formed therein having a pair of straight vertical sides and upper and lower arcuate sides. The opening 69 is of a size to receive therein the flange 36 of the reel member 34 and its configuration is such that it registers with a correspondingly shaped projecting portion 70 formed on the adjacent end of the cylindrical housing section 50. The projecting portion 70 is formed with a cylindrical interior periphery, as indicated at 72 in FIGURE 3, for rotatably supporting the adjacent extremity of the reel member 34. The opposite end portion of the reel member 34 is of a reduced diameter and is rotatably supported within a circular opening 74 formed in the central portion of the lateral wall 66 of the housing section 48.

The extremity of the reel member 34 opposite from the flange 36 extends beyond the opening 74 and into a cylindrical chamber 76 formed in the end section 54 of the housing. Disposed within the chamber 76 is a spiral return spring 78 having its inner end bent and disposed within an annular slot 80 formed in the adjacent extremity of the reel member 34 and its outer end bent and engaged within an opening 82 in a peripheral housing section wall defining the chamber 76 as best shown in FIGURE 5. The spiral spring 78 constitutes resilient means which normally biases the reel member 34 in a direction to wind up the strap 38 around the central outer periphery thereof.

Extending inwardly from the flange end of the reel member 34 is a bore 84 provided with threads 86 arranged to receive meshing threads 88 formed on the outer end of a piston rod member 90, the opposite end of which has a piston member 92 formed thereon. The cylindrical housing section 50 includes a cylindrical peripheral wall 94 and an annular end wall 96 formed integrally with the projecting portion 70, the peripheral wall 94 and the end wall 96 defining with the end housing section 52 a cylindrical chamber 98 within which is confined a body of fluid, preferably in the form of hydraulic fluid such as oil or the like. The piston member 90 is slidably mounted within the cylindrical chamber 98 and means is provided for preventing rotational movement of the piston member and piston rod member so as to limit the movement of the piston member within the chamber to a longitudinal reciprocating movement. While such means may take many different forms, as shown, there is an integral tang portion 100 projecting from the central portion to the piston member 92 on the side thereof opposite from the piston rod member 90, the tang portion 100 being rectangular in cross sectional configuration. The central portion of the end section 52 of the housing is provided with an outwardly projecting portion 102 defining an interior socket 104 of a cross sectional configuration generally conforming to that of the tang portion 100.

Any suitable means is provided for effectively sealing and confining the body of fluid within the chamber 98. As shown, an annular groove 106 is formed on the interior periphery of the end wall 96 to receive an O-ring 108 arranged to engage the exterior periphery of the piston rod member 90. The exterior periphery of the piston member 92 is provided with an annular groove 110 having an O-ring 112 mounted therein which is arranged to engage the inner periphery of the peripheral wall 94. Finally, an annular groove 114 is formed on the inner surface of the end section 52 and has an O-ring 116 therein which is arranged to engage the adjacent end surface of the peripheral wall 94.

Mounted between the projecting portion 70 of cylindrical housing section 50 and the annular flange 36 of the reel member is a braking means which, as shown, is preferably in the form of an annular washer 118. The washer may be of any suitable brake material, a preferred material constituting a hardened metal such as would be utilized as a bearing race in a conventional needle thrust bearing assembly.

Mounted within the piston is a normally open valve assembly, generally indicated at 120. As best shown in FIGURE 3, the piston member 92 has a bore 122 extending therethrough and a counter bore 124 is formed therein on the piston rod member side of the piston member. The counter bore 124 formed an annular shoulder within the piston member, the inner periphery of which defines a valve seat 126. As best shown in FIGURES 3 and 7, the normally open valve assembly 120 includes a valve member 128 of a diameter slightly greater than the diameter of the bore 122 but considerably less than the diameter of the counter bore 124. One end of the valve member 128 includes a conical portion 130 adapted to engage the seat 126 to close the bore 122 and the opposite end thereof is provided with an annular flange 132 having a groove 134 extending diametrically therethrough. A coil spring 136 is mounted within the counter bore 124 and has one end disposed in engagement with the shoulder defining the valve seat 126 and its opposite end disposed in engagement with the flange 132. The coil spring 136 thus serves to resiliently bias the valve member 128 into an open limiting position where it is retained by a sleeve-like insert 138 engaged within the counter bore 124 as by a sweat fit or the like and having an inwardly extending peripheral flange 140 arranged to be engaged by the flange 132.

Mounted within the piston member 92 is a normally closed valve assembly, generally indicated at 142. As best shown in FIGURE 3, a bore 144 is formed through the piston member preferably at a position therein diametrically opposite from the bore 122. The bore 144 is provided with a counter bore 146 which communicates with the side of the piston member opposite from the piston rod member and formed within the bore 144 an annular shoulder defining a valved seat 148.

As best shown in FIGURES 3 and 8, the normally closed valve assembly 142 preferably includes a ball valve member 150 disposed within the counter bore 146 and resiliently urged into engagement with the valve seat 148 by a coil spring 152. One end of the coil spring is disposed in engagement with the ball valve member 150 and the opposite end thereof is disposed in engagement with an apertured end wall 154 of a sleeve-like insert 156. The insert 156, like the insert 138 is fixedly engaged within the counter bore 146 as by a sweat fit or the like.

In addition to the normal open valve assembly 120 and the normally closed valve assembly 142, the piston member is also provided with a bleed orifice 158 which extends therethrough preferably at a position intermediate the valve assemblies. It will be understood that a bleed orifice may be embodied in either one or both of the valve assemblies if desired.

The above-recited structure is the same as that disclosed in the above-mentioned Bayer application and forms no part of the present invention per se, except insofar as it is combined with the features of the present invention hereinafter described to form an operative combination. The present invention is particularly suited to an automotive vehicle which includes a hydraulic bracking system, generally indicated at 160, such as the system schematically illustrated in FIGURE 1. The braking system 160 is of any conventional construction and includes the usual foot pedal 162 which is mounted on the frame of the vehicle for movement from a normally extended position wherein the braking system is inactive to a depressed position wherein the braking system is actuated, all in accordance with conventional practice.

Movement of the food pedal 162 is transmitted through a suitable motion transmitting linkage to a master cylinder assembly, generally indicated at 164. Here again, the particular construction of the master cylinder assembly may assume any conventional form and is preferably one which is operable to transmit hydraulic pressure generated as a result of the movement of the food pedal to a plurality of wheel brake assemblies, generally indicated at 166. Again, the brake assemblies 166 may be of any conventional construction and preferably are of the type which are adapted to be actuated in response to the communication of a hydraulic fluid under pressure thereto. In accordance with conventional practice, the hydraulic pressure for actuating the brake assemblies 166 is transmitted thereto through suitable conduit 168 from the master cylinder assembly 164. It will be understood that the system disclosed in FIGURE 1 is a schematic representation of one embodiment and that any conventional system may be utilized in accordance with the principles of the present invention.

As shown, the conduit 168 extening to the rear wheel brake assemblies has a branch conduit 170 connected therewith which branch conduit is connected in parallel with each of the reel devices 24 associated with the seat or seats of the vehicle, as by a conventional distributing manifold or valve 172. A plurality of conduits 174 extend from the valve 172, each of which is operatively associted with one of the reel devices 24.

An exemplary operative connection between each conduit 174 and the asosciated reel device is shown in FIGURE 3 in which the end of the conduit 174 is connected in communication with one end of a cylindrical chamber 176 formed in a body member 178. Slidably mounted in the chamber 176 is a large piston member 180 having a smaller elongated piston member 182 extending axially therefrom in a direction toward the end of the chamber 176 opposed to the conduit 174. At the opposite end of the body member 178, there is formed a smaller cylindrical chamber 184 communicating with the larger chamber 176 and of a size to receive the piston member 182 therein. The piston members 180 and 182 are resiliently urged into the limiting position shown in FIGURE 3 by a coil spring 186 mounted in the opposite end portion of the chamber 176 in surrounding relation to the piston member 182 and in engagement with the side of the large piston member 180 opposed to the conduit 174.

Connected in communicating relation to the outer end of the chamber 184 is one end of a conduit 188 having a branch conduit 190 connected therewith. The branch conduit 190 has a check valve 192 therein and is communicated with the associated reel device chamber 98 on the piston rod side thereof. The conduit 188 is provided with a second check valve 194 and is communicated with the opposite side of the chamber 98.

The check valve 192 may be of any suitable construction capable of preventing flow of fluid therethrough in a direction from the reel device chamber 98 into the conduit 190 and permitting flow therethrough in the opposite direction only when a predetermined pressure condition exists in the fluid in conduit 190. The check valve 194 may also be of any suitable construction but is operable in the reverse direction. That is, the check valve 194 will prevent flow from conduit 188 into the reel device chamber 98 and will permit flow in the opposite direction only when a predetermined pressure differential exists with respect to the hydraulic fluid in the conduit 188 and the hydraulic fluid in the communicating portion of the chamber 98.

*Operation*

Since the arrangement of the seat belt straps 20 and 22 and the shoulder belt straps 28 and 30 as shown in FIGURE 1 of the drawing is generally conventional, the operation of the present invention will be described from the standpoint of the operation of the devices 24 which serve to control the extension of the various belt straps of the apparatus shown in FIGURE 1. As previously indicated, the utilization of four separate reel devices to control each of the belt straps is not essential. Indeed, the arrangement could be limited to the utilizing of the single reel device adapted to control the extension of both shoulder belt straps. It will be understood that the shoulder belt straps provide a greater confinement to the movement of the seat occupant and therefore, there is a greater need to provide for the extension of these belts as a result of the normal movement of the upper torso of the seat occupant, than is the case with the seat belt straps. On the other hand, the shoulder belt straps are in a position to effect a greater control of the movement of the seat occupant under emergency conditions. That is, a simple fixedly anchored seat belt arrangement will serve to hold the seat occupant in the seat under emergency conditions while permitting the occupant substantially free movement of the upper torso, and by the same token, movement of the upper torso is not effectively controlled under emergency conditions. With the present reel device, effective control of the upper torso of the seat occupant under emergency conditions is obtained while, on the other hand, relatively unrestricted movement of the upper torso of the seat occupant is possible under normal conditions.

This desirable selective control is obtained by the present invention in the following manner. It will be noted that the reel member 34 will be rotated in a counter clockwise direction, as viewed in FIGURES 4 and 5, as the strap 38 is extended. Assuming the strap 38 to be connected with either or both of the shoulder belt straps 28 and 30, the extension of the strap will occur whenever the seat occupant moves the upper torso in a direction away from the normal erect position against the back cushion 18. The strength of the spiral return spring 78 is such that the reel member 34 can be readily turned against the action of the spring in response to the normally contemplated movements of the seat occupant. Conversely the spring will effect a counter clockwise rotational movement of the reel member, as viewed in FIGURES 4 and 5 to wind up the strap 38 in response to the movement of the upper torso of the seat occupant toward the erect position with respect to the back cushion.

It will be noted that since the piston rod member 90 is restrained against rotational movement by the engagement of the tang portion 100 within the socket 104, rotational movement of the reel member 34 will result in a longitudinal movement of the piston rod member 90 and the piston member 92 through the operation of the inner meshing threads 86 and 88. In FIGURE 3, the piston member 92 is shown in one limiting position wherein a maximum amount of the strap 38 is wound about the reel member 34. This position would correspond with the extension of strap 38 when the seat occupant is disposed in an erect position with respect to the back cushion 18. Moreover, the reel devices is initially assembled in this position so that there will be a full piston rod displacement within the cylindrical chamber 98. The pitch of the threads 86 and 88 are such that counter clockwise rotation of the reel member, as by extension of the strap 38, will result in a longitudinal movement of the piston member 92 from the position shown in FIGURE 3 toward the end wall 96 of the cylindrical chamber 98.

It will be noted that this movement of the piston rod member will result in the flow of hydraulic fluid within the cylindrical chamber 98 from the piston rod side of the piston member to the opposite side thereof past the normally opened valve assembly 120 and the normal closed valve assembly 142 and through the bleed orifice 158. On the other hand, a retraction of the strap 38 and hence a counter clockwise rotation of the reel member 34 under the action of the return spring 78 will result in a longitudinal movement of the piston member 92 away from the end wall 96 causing a flow of hydraulic fluid within the cylindrical chamber 98 from the socket side of the piston member to the piston rod side thereof past the normally open valve 120 and through the bleed orifice 158.

Under normal conditions, extension and retraction of the strap 38 will occur only as a result of the normal movements of the upper torso of the seat occupant. The normally opened valve assembly 120 is such that there is provided a flow path for the hydraulic fluid of a side which, added to the size of the bleed orifice 158 permits flow of fluid from one side of the piston member, to the other within the cylindrical chamber 98 without any substantial build-up of pressure in the hydraulic fluid. Consequently, under normal conditions, the rotational movement of the reel member 34 will merely result in a relatively unrestricted flow of fluid from one side of the piston to the other within the chamber 98. Because there is no substantial pressure build-up in the hydraulic fluid there will be no substantial axial force transmitted to the reel member by the piston member and the piston rod member which would tend to frictionally engage the brake member 118 between the annular flange 86 and the projecting portion 70.

As previously indicated, the strength of the spring 78 is such as to offer no substantial resistance to the counter clockwise rotational movement of the reel member as viewed in FIGURES 4 and 5, during the extension of the strap and the additional friction of the intermeshing threads 86 and 88 as well as the flow of hydraulic fluid within the cylindrical chamber 98 does not appreciably add to this resistance. It will be noted, however, that the volume of the cylindrical chamber 98 increases by the piston rod displacement during the movement of the piston member toward the end wall 96 so that a vacuum forms in the chamber 98 on the socket side of the piston member. This vacuum tends to provide a slight resistance to the extension of the strap which increases as the strap is extended. This force aids, to some extent, the return spring 78, although for all practical purposes it can be regarded as negligible.

The present reel device will thus permit maximum normal movements of the upper torso of the seat occupant without applying any appreciable resistance to such movements. However, where emergency conditions are encountered, such as when the vehicle is involved in an accident, strong forces may be applied to the seat occupant tending to move the occupant out of the seat. Any such force, which would result in a movement of the upper torso of the seat occupant away from the erect position with respect to the back cushion 18, will result in a rapid extension of the strap 38 and hence a rapid counter clockwise rotational movement of the reel member 34, as viewed in FIGURES 4 and 5. This rapid rotational movement of the reel member will, in turn, result in a relatively fast movement of the piston rod member toward the end wall 96. At a predetermined rotational speed of the reel member 34, which is above that normally encountered as a result of normal bodily movements, the movement of the piston member 92 will impart a greater energy to the body of fluid on the piston rod side of the piston within the chamber 38 than can be dissipated by velocity energy flow through the normally open valve assembly 120. In this way, a pressure is built up in the piston rod side of the chamber 98 which is sufficient to overcome the spring 136 of the valve assembly 120 and effect an axial movement of the valve member 128 to the left as viewed in FIGURE 3, until the conical surface 130 engages the seat 126. When the normally open valve assembly 120 closes, continued movement of the piston member 92 toward the end wall 96 will result in a rapid build up of pressure in the hydraulic fluid on the piston rod side of the chamber 98. At this point the pressurized fluid will resist further movement of the piston member and hence the piston rod member so that further rotational movement of the reel member will result in an axial movement of the reel member which applies the braking means through the frictional engagement of the brake member 118 between the co-operating surfaces of the flange 36 and the projection portion 70. As the pressure in the piston rod side of the chamber 98 increases, the force of spring 152 will be overcome and the ball valve member 150 of the normally closed valve assembly 142 will move away from the seat 148 and thus permit flow through the bore 144.

The action of the normal opened valve assembly 120 and the normally closed valve assembly 142 is graphically illustrated in FIGURE 9 wherein the force opposing the extension of the strap is plotted against the speed of extension of the strap. This curve represents the theoretical curve which would be obtained by the present invention and it will be noted that the point marked "X" on the curve indicates the point at which the normally open valve assembly 120 closes whereas the point "Y" indicates the point on the curve at which the normally closed valve assembly 142 opens. Thus, it can be seen that the normal extension velocities of the strap resulting from normal seat occupant movements will be within the range from 0 to a point slightly less than the value indicated at "X." Under these circumstances there will be a relatively constant force (of generally negligible relative strength) restricting the extension of the strap (the force curve as shown is increasing slightly due to the conditions mentioned above). When the normally open valve assembly 120 closes, there is an immediate rise in the pressure of the hydraulic fluid and hence an immediate application of the braking means. This results in a very sharp almost vertical increase in the force resisting extension of the strap. In the event that this greatly increased force is not sufficient to retard the speed of strap extension, then the normally closed valve assembly 142 will open permitting an increased resistance to the strap extension which is proportional to the square of the velocity of flow past the normally closed valve assembly. It is contemplated, however, that the initial braking action applied as a result of the closing of the normally opened valve assembly 120 would have the effect of retarding the speed of strap extension so that the curve would follow the dotted lines indicated at "Z" in FIGURE 9. Even if the operation should proceed past the point "Y" before the speed is retarded, the curve would follow back down the upwardly sloping line and then follow the lines "Z."

The bleed orifice 158 permits the pressure within the piston rod side of the chamber 98 to be reduced as the extension of the strap is reduced to approximately zero speed, thus preventing any tendency of feed back of rotary movement to the reel member. Moreover, the pitch of the threads 86 and 88 also prevent such action. However, the braking means will remain applied once stoppage has occurred so long as there is any appreciable force applied tending to extend the strap.

In accordance with the principles of the present invention, the operation described above, which is the same operation as that set forth in the above-mentioned Bayer application, is modified by the present invention in the following manner. First, it will be understood that the above operation will be achieved in accordance with the principles of the present invention so long as the forces tending to move the seat occupant forwardly under emergency conditions are not accompanied by an excessive or abnormal application of brake pressure by the seat occupant to the brake pedal 162.

The check valve 192 is such that it will remain closed so long as the pressure in the hydraulic conduit 168 of the braking system remains below a predetermined value. Such predetermined value is preferably greater than the predetermined pressure condition at which the valve member 128 of the valve assembly 120 will close. Also, the predetermined pressure condition within the brake system required to open the check valve is of a value greater than that which would be applied by the maximum normal pressures created as a result of a maximum normal application of the brake pedal 162. Stated differently, the check valve 192 is adapted to open only when the seat occupant applies the brake pedal 162 with an excessive or abnormal force, such as would be required under emergency conditions.

The spring 186 is of a force sufficient to retain the piston members 180 and 182 in the limiting position shown in FIGURE 3 so long as the pressure in the conduit 174 does not exceed the normal pressure of the brake system or at most the maximum normal pressures encountered in the brake system. It will be understood that the conduit 188 and 190 and the small chamber 184 are filled with hydraulic fluid when the reel device and piston members 180 and 182 are disposed in the position shown in FIGURE 3.

With the apparatus in the condition shown in FIGURE 3, if a situation is presented where the seat occupant depresses the brake pedal 162 with an abnormal force sufficient to generate pressure in the conduit 168 of a value sufficient to open the check valve 192, the hydraulic pressure will be immediately communicated with the chamber 98 of the reel device associated therewith, thus establishing in the chamber 98 on the piston rod side thereof an immediate pressure condition sufficient to cause the valve assembly 120 to move into its closed position. Under these circumstances, it can be seen that any subsequent extensive movement of the associated strap and corresponding rotational movement of the reel will result in the application of the braking pressure.

The theoretical curve obtained by the above-mentioned operation of the present invention is shown in phantom lines in FIGURE 9 and it will be noted that the points marked X' and Y' correspond with the points X and Y previously mentioned. The transmitting of the excessive hydraulic braking pressure to the reel device primarily effects an application of the braking action of the reel device sooner than would be the case where no extraneous hydraulic pressure is applied other than by the rotation of the reel. Consequently, with the present invention, all of the advantages of the reel device disclosed in the Bayer application are obtained. That is, the reel device will permit normal movements of the seat occupant under normal conditions. Such normal conditions would also include the normal actuations of the brake system 160. The present invention, however, also obtains the added advantage of a more positive actuation of the braking action of the reel device where the emergency condition encountered includes an excessive application of braking force by the seat occupant to foot pedal of the braking system. In this way, the retarding action provided by the reel device is immediately available to the seat occupant so that the peak forces to which the seat occupant is subjected are further reduced to a minimum.

In the event that the emergency condition in which the brake pedal was abnormally actuated passes without accident, it is then desirable to return the reel device back into its normal operative condition. It will be understood, however, that the passage of hydraulic fluid from the conduit 190 into the chamber 98 during the emergency application of the brake pedal has added hydraulic fluid to the chamber 98 which will prevent the full return of the reel device piston 92 into its initial limiting position. This added hydraulic fluid is allowed to leave the reel device chamber 98 through the check valve 194. As previously indicated, the check valve 194 is such that it will open only when the pressure in the communicating portion of the reel device chamber 98 is of a predetermined value greater than the pressure in conduit 188. This condition is never reached during normal operation of the reel device because the pressure in the tang side of the chamber 98 reduces as the piston 92 moves to the right as shown in FIGURE 3, as previously explained. When hydraulic fluid from the conduit 188 has entered the chamber 98, for example after emergency brake pedal application, spring 186 will be depressed so that a force is set up which will effect a flow of fluid from the chamber 98 through the check valve 194 until the piston members 180 and 182 return to their limiting position shown in FIGRE 3. In this way the same amount of hydraulic fluid added to the chamber 98 through the check valve 192 during emergency conditions will be automatically removed from the chamber 98 through the check valve 194 when the emergency conditions are removed.

It will be understood that the large and small piston arrangement 180 and 182 will provide a multiplication of the hydraulic pressure in the brake system to the hydraulic fluid of the reel device. The increased multiplication is only exemplary and the particular ratio relationship will be dependent upon the individual requirements of each of the hydraulic systems. Moreover, while it is preferred to isolate the hydraulic fluids of each system by a pressure responsive device such as the dual piston arrangement shown or some equivalent device such as flexible diaphragm, it is within the contemplation of the present invention to permit direct communication of the hydraulic fluid of the brake system with the hydraulic fluid of the reel devices.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a vehicle having a foot-actuated brake pedal, the combination comprising safety strap means for fitment to a seat occupant of the vehicle, means operatively connected with said safety strap means for resiliently controlling movement of said safety strap means in response to the normal movements of a seat occupant to which said safety strap means is fitted, actuatable means for stopping the movement of said safety strap means corresponding with an abnormal seat occupant movement in a direction away from the associated seat, and means normally inoperable during the normal actuations of said brake pedal operable in response to the actuation of said brake pedal with a predetermined abnormal force for actuating said stopping means.

2. A safety device for a seat occupant of a vehicle including a foot actuated brake pedal comprising a housing, a reel carried by said housing for rotational movement in opposite directions, a flexible elongated element connected at one end to said reel so as to be wound up on said reel in response to rotational movement of said reel in one direction, resilient means acting between said housing and said reel for resiliently urging said reel toward a limiting position in said one direction of rotational movement wherein a maximum amount of said elongated element is wound around said reel, the opposite end of said elongated element being arranged to be operatively connected with the seat occupant so as to pay out from said reel and effect rotational movement of said reel in the opposite direction against the action of said resilient means in response to movements of the seat occupant in a direction away from a normal erect position with respect to the seat, actuatable means for stopping the rotational movement of said reel in said opposite direction, and means normally inoperable during the normal actuations of the brake pedal of the vehicle operable in response to the actuation of the brake pedal with a predetermined abnormal force for actuating said reel stopping means.

3. A device as defined in claim 2 wherein said means for actuating said reel stopping means includes means normally inoperable during rotational movement of said reel in said opposite direction resulting from normal seat occupant movements and operable in response to abnormal rotational movements of said reel in said opposite direction as a result of abnormal seat occupant movements for actuating said reel stopping means.

4. A safety device for a seat occupant of a vehicle having a hydraulic brake system comprising a housing, a reel carried by said housing for rotational movement in opposite directions, a flexible elongated element connected at one end to said reel so as to be wound up on said reel in response to rotational movement of said reel in one direction, resilient means acting between said housing and said reel for resiliently urging said reel toward a limiting position in said one direction of rotational movement wherein a maximum amount of said elongated element is woundaround said reel, the opposite end of said elongated element being arranged to be operatively connected with the seat occupant so as to pay out from said reel and effect rotational movement of said reel in the opposite direction against the action of said resilient means in response to movements of seat occupant in a direction away from a normal erect position with respect to the seat, means for confining a body of hydraulic fluid, means operatively connected with said reel for applying pressure to said body of hydraulic fluid in response to rotational movement of said reel in said opposite direction and for applying a braking action tending to prevent rotation of said reel in said opposite direction in response to a predetermined elevated pressure condition in said body of hydraulic fluid, means defining flow path means for said body of hydraulic fluid providing for a relatively unrestricted flow in said body of hydraulic fluid at rotational speeds of said reel in said opposite direction below a predetermined value which corresponds with a speed greater than those imparted thereto by normal occupant movements but less than those imparted thereto by abnormal occupant movements so that such normal movements can take place without the pressure of said hydraulic fluid body reaching said predetermined pressure condition and hence without applying said braking action on said reel and providing for restriction to the flow of hydraulic fluid at rotational speeds of said reel in said opposite direction above said predetermined value so as to cause the pressure in said hydraulic fluid body to reach said predetermined pressure condition and hence said braking action to be applied and means for operatively communicating said body of fluid with the hydraulic fluid of the hydraulic brake system of the vehicle so as to cause said body of fluid to reach said predetermined pressure condition in response to a predetermined actuation of said hydraulic brake system.

5. A safety device for a seat occupant of a vehicle having a hydraulic brake system comprising a housing, a reel carried by said housing for rotational movement in opposite directions and for limited axial movement, a flexible elongated element connected at one end to said reel so as to be wound up on said reel in response to rotational movement of said reel in one direction, resilient means acting between said housing and said reel for resiliently urging said reel toward a limiting position in said one direction of rotational movement wherein a maximum amount of said elongated element is wound around said reel, the opposite end of said elongated element being arranged to be operatively connected with the seat occupant so as to pay out from said reel and effect rotational movement of said reel in the opposite direction against the action of said resilient means in response to movements of the seat occupant in a direction away from a normal erect position with respect to said seat, said housing including means defining a cylindrical chamber disposed in axial alignment with said reel, a piston mounted in said chamber for axial movement in opposite directions, means operatively connected between said reel and said piston for effecting axial movement of the latter in one direction and in an opposite direction in response to the rotational movement of said reel in said one direction and said opposite direction respectively, said chamber being filled with hydraulic fluid on opposite sides of said piston at least when said piston is disposed therein in a limiting position corresponding to said limiting position of said reel, said piston having a plurality of openings extending therethrough communicating the fluid in said chamber on opposite sides of said piston, a first valve assembly disposed in a normally open position in one of said openings operable to permit relatively unrestricted flow of fluid within said chamber from and to one side of the piston to and from the other side thereof in response to the axial movement of said piston in said one direction and said opposite direction respectively, said first valve assembly being operable to close in response to movement of said piston in said opposite direction at speeds above a predetermined value corresponding to a speed above that imparted thereto as a result of normal seat occupant movements in a direction away from the seat and less than that imparted thereto as a result of abnormal seat occupant movements in a direction away from the seat to thereby restrict the flow of fluid therethrough from said one side of said piston to the other side thereof and create pressure conditions within the fluid on said one side of said piston above a predetermined value, a second valve assembly disposed in a normally closed position in another of said openings operable to open in response to the creation of a pressure condition within the fluid on said one side of said piston above a second predetermined value substantially greater than said first predetermined pressure condition value to thereby permit flow of fluid therethrough from said one side of said piston to the other side thereof, braking means between said housing and said reel operable by limited axial movement of said reel in response to the creation of pressure conditions within the fluid on said one side of said piston above said first predetermined value to apply a braking force resisting rotational movement of said reel in said opposite direction which rapidly increases in response to increasing pressure conditions up to said second predetermined value and increases as the square of the velocity of flow through said second valve assembly in response to increasing pressure conditions above said predetermined value, hydraulic fluid containing conduit means communicating with said one side of said chamber and operatively communicating with the hydraulic fluid of said hydraulic brake system, valve means in said conduit means normally closing communication between the hydraulic fluid on said one side of said piston and the hydraulic fluid in said conduit means operable in response to an increase in the pressure in the hydraulic fluid of said brake system resulting from an actuation thereof with an abnormal force for communicating such increased pressure to the hydraulic fluid on said one side of said piston to establish therein a pressure condition above said predetermined value.

References Cited by the Examiner

UNITED STATES PATENTS

| 2,680,476 | 6/1954 | Saffell | 280—150 |
| 3,018,065 | 1/1962 | Cushman | 280—150 X |
| 3,077,324 | 2/1964 | Strickland | 280—150 X |

A. HARRY LEVY, *Primary Examiner.*